United States Patent
Delatte

(10) Patent No.: US 6,295,869 B1
(45) Date of Patent: Oct. 2, 2001

(54) CAPACITIVE MEASUREMENT PROBE FOR MEASURING THE LEVEL OF A LIQUID AND TANK EQUIPPED WITH SUCH A PROBE

(75) Inventor: Daniel Delatte *deceased*, late of Saint Maur (FR), by Patrick Delatte and Anne-Marie Delatte, legal representatives

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/285,072

(22) Filed: Apr. 2, 1999

(30) Foreign Application Priority Data

Apr. 2, 1998 (FR) .................................................. 98 04117

(51) Int. Cl.$^7$ ............................ G01F 23/00; H01G 5/012
(52) U.S. Cl. ...................... 73/304 C; 73/307; 361/284
(58) Field of Search ............................ 73/290 R, 304 R, 73/304 C, 305, 307; 361/278, 284

(56) References Cited

U.S. PATENT DOCUMENTS

| | | |
|---|---|---|
| 3,901,079 * | 8/1975 | Vogel .................................. 73/304 C |
| 4,231,250 | 11/1980 | Leber . |
| 4,258,444 | 3/1981 | Orszullok . |
| 4,483,463 * | 11/1984 | Buschmann ........................ 73/304 C |
| 5,065,139 | 11/1991 | Shefsky . |
| 5,669,263 * | 9/1997 | Borchers et al. ................... 73/304 C |

FOREIGN PATENT DOCUMENTS 195 07 616
A1   9/1996   (DE) .

* cited by examiner

*Primary Examiner*—Harshad Patel
(74) *Attorney, Agent, or Firm*—Young & Thompson

(57) ABSTRACT

Capacitive measurement probe (6) for measuring the level of a liquid in a tank (1), of the type comprising a body (7) for mounting the probe and a first plate (8) which is supported by the body and is intended, together with a second plate (41), to form a measurement capacitor intended to be connected to an electrical voltage supply, which plates are intended to be partially immersed in the liquid and to define, between them, a space for receiving the liquid. The first plate (8) is mounted on the body so that it can be adjusted between at least a high measurement position and a low measurement position.

14 Claims, 4 Drawing Sheets

CAPACITIVE MEASUREMENT PROBE FOR MEASURING THE LEVEL OF A LIQUID AND TANK EQUIPPED WITH SUCH A PROBE

FIELD OF INVENTION

The present invention relates to a capacitive measurement probe for measuring the level of a liquid in a tank, of the type comprising a body for mounting the probe and a first plate which is supported by the body and is intended, together with a second plate, to form a measurement capacitor intended to be connected to an electrical voltage supply, which plates are intended to be partially immersed in the liquid and to define, between them, a space for receiving the liquid.

The invention applies in particular to the storage of nitrogen in liquid/vapour equilibrium, for example for the preservation of biological products.

BACKGROUND OF THE INVENTION

For a given use, for example for medical applications, nitrogen in liquid/vapour equilibrium is stored in a tank with a predetermined nominal level of liquid nitrogen depending on the use.

Such a tank is generally equipped with a probe of the aforementioned type, placed vertically in order to measure the liquid level and optionally to regulate this level to the predetermined nominal value. A probe of this type is conventionally incorporated into a capacitive measurement device comprising an electronic processing unit which incorporates the voltage supply. This electronic unit is designed to determine the height of the liquid in the tank from the value of the capacitance of the measurement capacitor of the probe since, because of the different dielectric constants of the liquid and gas that are contained in the tank, the capacitance of the capacitor varies proportionally to the height of liquid between its plates and therefore depends on the level of liquid in the tank.

Generally speaking, for a given tank, the probe must be able to measure a whole range of nominal liquid levels. This range comprises a low nominal level of liquid, for example in the case in which the user wishes to store biological products in gaseous nitrogen in the tank, and a high nominal level of liquid, for example in the case in which the user wishes to store biological products in liquid nitrogen in the tank.

Consequently, the height of the plates of such a probe is of the same order of magnitude as the maximum storage height in the tank in question. Thus, different probes are necessary for tanks having different maximum storage heights.

SUMMARY OF THE INVENTION

The object of the invention is to solve this problem, by providing a standard probe which can be used for tanks having different maximum storage heights.

For this purpose, the subject of the invention is a capacitive measurement probe for measuring the level of a liquid in a tank, of the aforementioned type, characterized in that the first plate is mounted on the body so that it can be adjusted between at least a high measurement position and a low measurement position.

Depending on particular embodiments, the probe may comprise one or more of the following characteristics, taken in isolation or in any technically possible combination:

the first plate can slide with respect to the mounting body between the said positions;

the second plate forms part of the probe and is mounted on the body of the probe so that it can be adjusted between at least a high measurement position and a low measurement position;

the said second plate is fastened to the first plate;

the or each plate is tubular and slides telescopically with respect to the body of the probe;

the probe comprises means for returning the or each plate towards one of the said positions; and the return means are means for electrically connecting the or each plate to the voltage supply.

The subject of the invention is also a storage tank, especially for a cryogenic fluid in liquid/vapour equilibrium, characterized in that it is equipped with a probe as described above, the or each plate of which is placed in a cavity communicating with the tank.

Depending on particular embodiments, the tank may comprise one or more of the following characteristics, taken in isolation or in any technically possible combination:

the cavity comprises a fixed plate which is placed opposite a plate of the probe and, together with the latter, defines a space for receiving the fluid, forming a measurement capacitor; and the tank comprises an electronic processing unit which includes a voltage supply and which is connected to the or each measurement capacitor, this unit being suitable for determining the level of the liquid and/or for controlling means for supplying the tank with cryogenic liquid and/or for actuating an alarm.

BRIEF DESCRIPTION OF THE DRAWINGS

The invention will be more clearly understood on reading the description which follows, given solely by way of example and with reference to the appended drawings, in which.

DETAILED DESCRIPTION OF THE PREFERRED EMBODIMENTS

Figure 1:
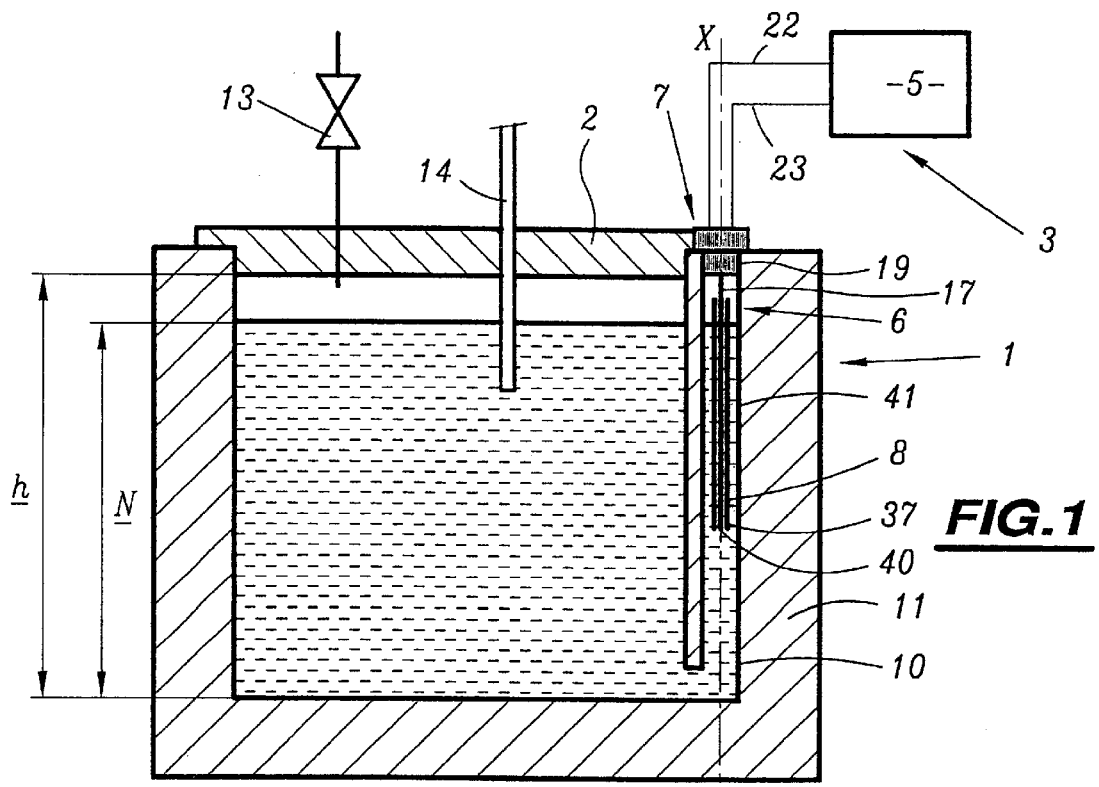
FIGS. 1 and 2 are lateral and diagrammatic cross sections through a tank according to the invention, illustrating, respectively, two different measurement positions of the capacitive measurement probe.

FIG. 1 shows a thermally insulated tank 1 for storing nitrogen in liquid/vapour equilibrium, the tank being closed by a lid 2 and equipped with a capacitive measurement device 3 for measuring the level of liquid in the tank 1.

This device 3 comprises a conventional electronic processing unit 5, incorporating a voltage supply, and a capacitive measurement probe 6 electrically connected to this unit 5.

The probe 6, of axisymmetric general shape, of axis X—X, comprises a mounting body 7 and a first plate 8 supported by the body 7. The probe 6 is housed in a tubular cavity 10 having a circular base and a vertical axis coincident with the axis X—X, which cavity is made in a side wall 11 of the tank 1. This cavity 10 communicates with the bottom of the tank 1, on the one hand, and emerges in the open air, in the absence of the probe 6, on the other hand.

The lid 2 is fitted with a pressure-limiting valve 13 and with a vertical tube 14 for drawing off nitrogen from the tank 1.

In FIG. 1, the chosen nominal level N of liquid in the tank 1 is a high level in order to allow biological products to be stored in the liquid nitrogen in the tank 1. Thus, the nominal level N is slightly below the maximum storage height h of the tank 1, as will be explained below.

A pipe for supplying the tank with liquid nitrogen has been shown at 14.

Figure 3:
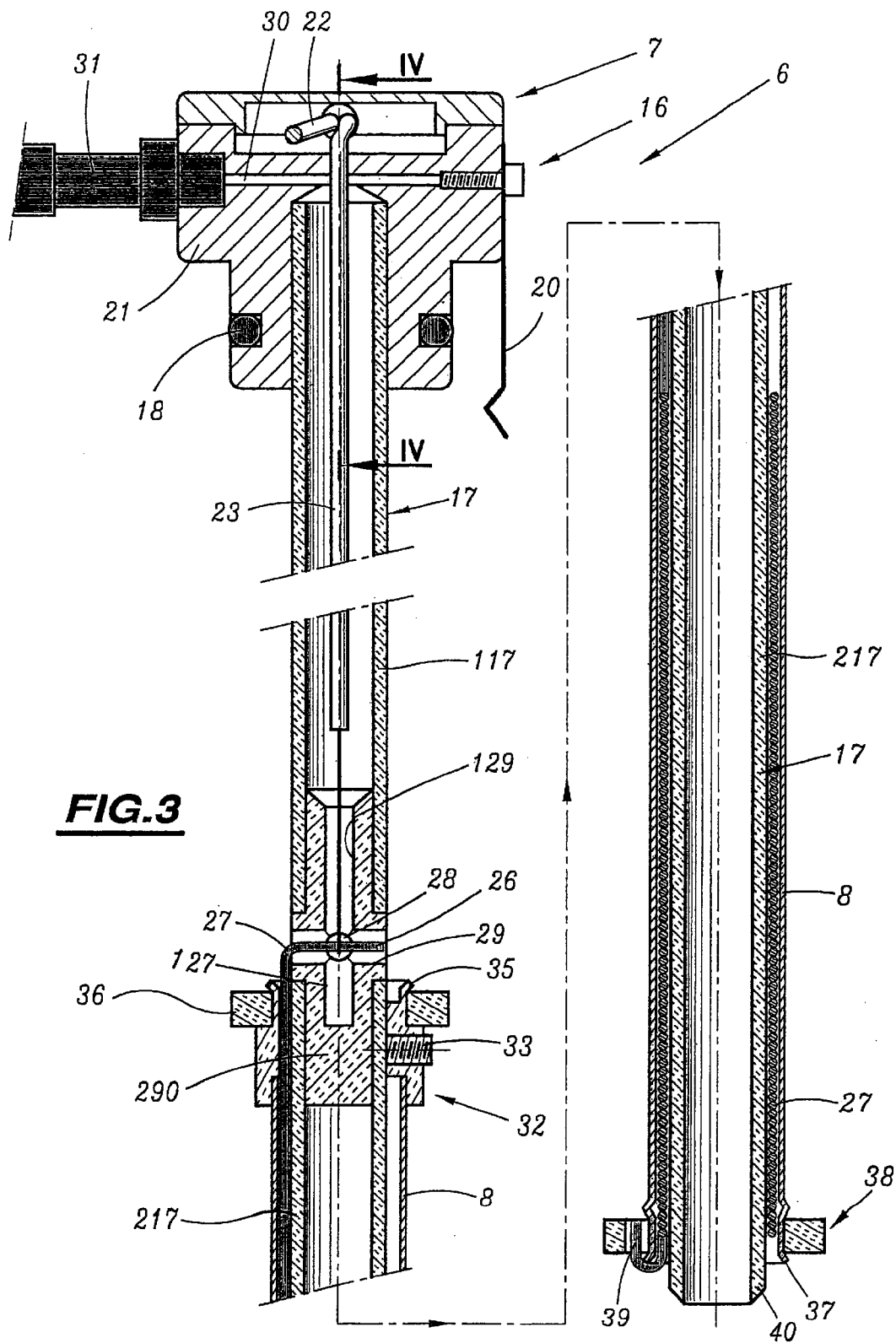
FIG. 3 is a partial longitudinal sectional diagrammatic view of the probe in FIG. 1.
Figure 4:
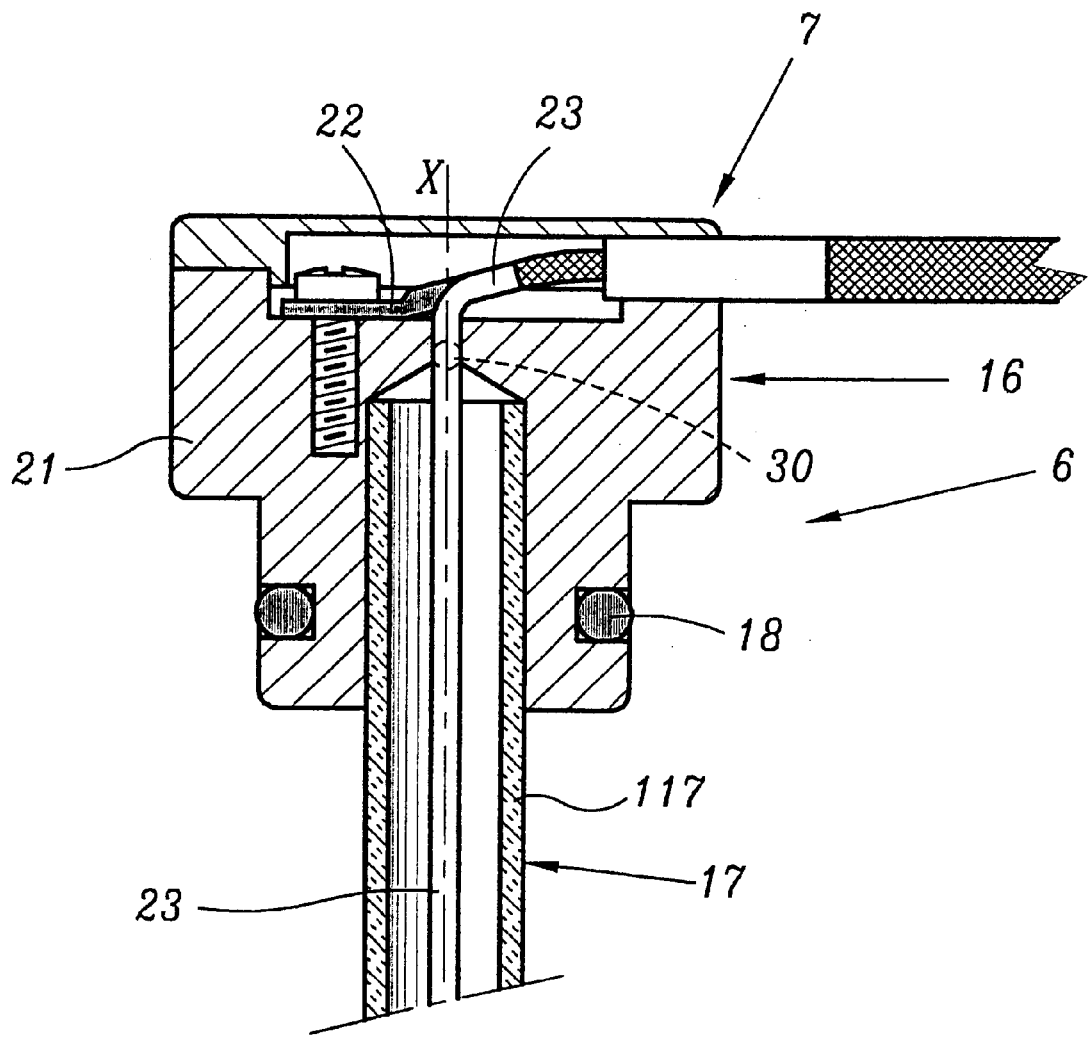
FIG. 4 is a partial longitudinal sectional view taken along the line IV—IV in FIG. 3.

As illustrated in greater detail in FIGS. 3 and 4, the body 7 comprises a top head 16 and an electrically insulating guiding rod 17 consisting of two sections, an upper section 117 and a lower section 217, extending this head 16 downwards. The head 16 is fitted with sealing means 18, in the form of an 0-ring seal, in order to form a plug which seals off the top opening 19 (FIG. 1) of the cavity 10.

This head 16 also comprises a springy metal leaf 20 screwed onto a metal body 21 of the head 16. Once the probe has been mounted on the tank 1 (FIG. 1), one region (not shown) of the wall 11 is pinched between this leaf 20 and the body 21.

The head 16 houses two conductors 22 and 23 which connect the unit 5 to the probe 6. A first conductor 22 is electrically connected (FIG. 4), by means of a lug and a screw, to the body 21 of the head 16 and therefore to the leaf 20.

The second conductor 23 (FIG. 3) passes along the inside of the hollow rod 17. At its hollow end, it is electrically conducted to a first end 26 of a long thin helical metal spring 27 by means of a screw 28 transverse to the rod 17. The screw 28 fixes the end 26 of the spring 27 in the rod 17.

A transverse channel 29 passes through the rod 17 level with the screw 28, perpendicular to the latter, and communicates with the inside of the rod 17 via a vertical rising channel 129. For this purpose, a piece 290, fitted into the facing ends of the sections 117 and 217 of the rod 17, is provided with channels 127 and 129. This piece 290 closes off the longitudinal internal passage of the rod 17 at a level slightly below that of the channel 29.

The head 16 furthermore includes a transverse duct 30 made in the metal body 21 and communicating, on the one hand, with the inside of the hollow rod 17, and therefore with the channel 29, and, on the other hand, with a pipe 31 for the removal of gaseous nitrogen, this pipe not being shown in cross section in FIG. 3.

The plate 8 is a metal tube having a circular base engaged on the rod 17 and sliding telescopically along the latter.

The plate 8, of axis X—X, is extended at its top part by a sleeve 32 fastened to the plate 8, and a transverse screw 33 for adjusting the position of the plate 8 on the rod 17 passes through this sleeve 32.

The top end 35 of the sleeve 32 is surrounded on the outside by an insulating spacing ring 36 of axis X—X.

The bottom end 37 of the plate 8 is fitted with an insulating spacing end-piece 38, in the form of a ring, of axis X—X.

The spring 27 passes between the first plate 8 and the rod 17, and its bottom end 39 is fixed and electrically connected to the end 37 of the first plate 8.

The spring 27 is wound around the rod 17 in the bottom part of the plate 8.

The position of the first plate 8 in FIGS. 1 and 3 is a high measurement position, in which the bottom end 37 of the first plate 8 and the bottom end 40 of the rod 17 are approximately at the same level. This high position is suitable for measuring a high liquid level N, as illustrated in FIG. 1.

In this FIG. 1, the probe 6 is mounted on the tank 1 by means of the head 16, and only a top region of the first plate 8 is exposed. The rings 36 and 38 keep the first plate 8 at some distance from the metal wall 41 defining the cavity 10. This metal wall 41, opposite the first plate 8, forms, together with the latter, a measurement capacitor. The second plate of this capacitor, consisting of the metal wall 41, is fixed and electrically connected to the electronic processing unit 5 by means of the leaf 20 and of the conductor 22. The first plate 8 of this capacitor is electrically connected to the unit 5 by means of the spring 27 and of the conductor 23. The plates 8 and 41 between them define a space for receiving the liquid and are partially immersed in the latter.

Thus, the probe 6, incorporated in the capacitive measurement device 3, makes it possible in its high position to measure a high level N of liquid in the tank 1 by conventionally determining the capacitance of the measurement capacitor of the probe 6.

The means 18 for sealing the head 16 prevent moisture from penetrating into the cavity 10, which mould disturb the operation of the probe 6.

Figure 2:
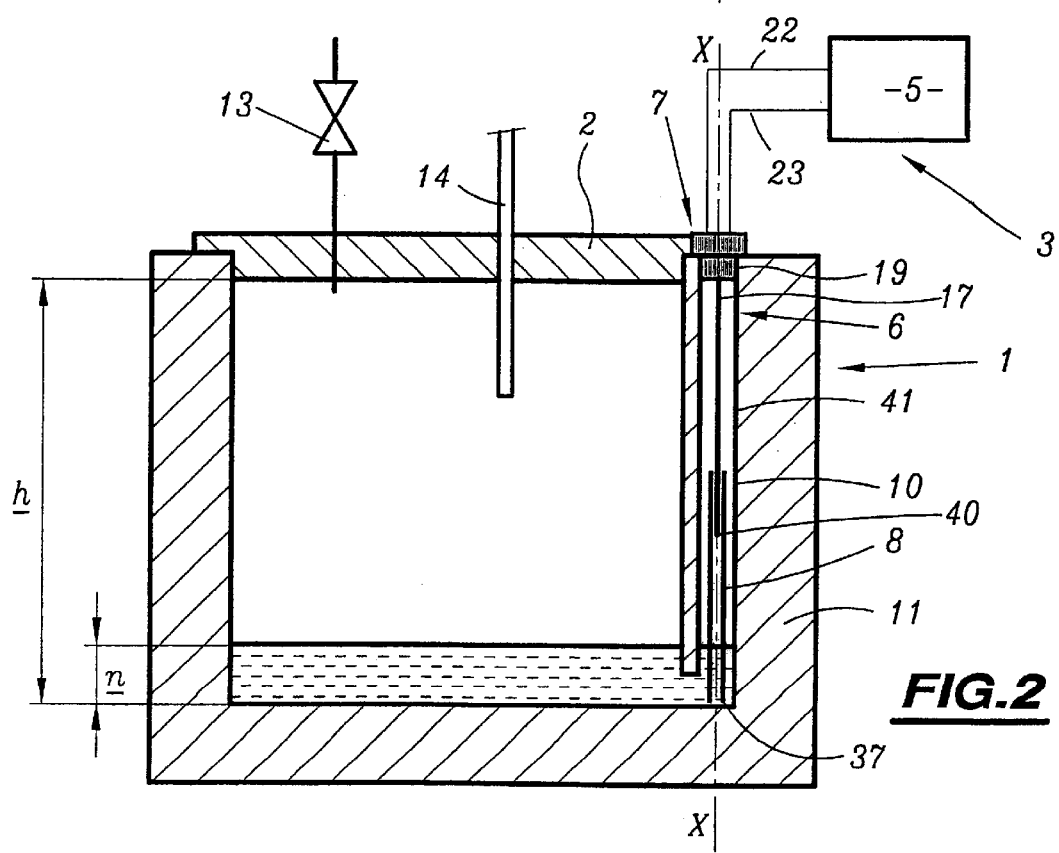

FIG. 2 illustrates the use of the probe 6 for measuring a low level of liquid n in the tank 1.

In this case, the first plate 8 is in a low position with respect to the body 7. In this low measurement position, the end 40 of the rod 17 is moved away towards the bottom of the end 37 of the first plate 8. The total length of the probe 6 is therefore greater in this position than in the high position illustrated in FIGS. 1 and 3, so that only a bottom part of the first plate 8 and of the wall 41 of the tank is immersed in the liquid (FIG. 2), thus allowing the low liquid level n to be measured.

In order to change the position of the first plate 8 with respect to the rod 17, the probe being outside the cavity 10, the screw 33 is slackened, the plate 8 is then slid along to the desired position and the screw 33 is retightened.

The spring 27 constitutes means for returning the first plate towards its high position (FIGS. 1 and 3). This is because this spring 27 gradually stretches as the first plate 8 is moved towards its low position.

The probe 6 is one whose length can be adjusted between its retracted position (FIGS. 1 and 3) and its deployed position (FIG. 2).

The probe 6 can in practice measure any level of liquid in the tank 1, by varying the extension of the probe 6.

It may be imagined that this adjustable telescopic probe 6 can be used for tanks 1 having different maximum storage heights h and can therefore constitute a standard probe for a whole range of tanks.

Moreover, the conventional electronic processing unit 5 is generally suitable for actuating an alarm and/or means (not shown) for filling with liquid nitrogen via the pipe 14 when the measured liquid level is outside a predetermined range, for example a [−5%/+5%] range. This range is centred on the chosen nominal level n or N, and its extent is defined with respect to the total measurement range of the probe 6.

The extent of this [−5%/+5%] range thus corresponds to 10% of the length of the plate 8 of the probe 6. Thus, at least 5% of the length of the plate 8 must therefore be exposed in the case shown in FIG. 1 and at least 5% of the length of the plate 8 must be immersed in the case shown in FIG. 2. These minimum exposed or immersed lengths are therefore less than those of a conventional probe in which the first plate is appreciably longer than that of the probe 6. Thus, the probe 6 according to the invention makes it possible to neutralize a smaller part of the height h of the tank 1 and therefore to reduce the total height of such a tank for a given maximum level N.

Figure 5:
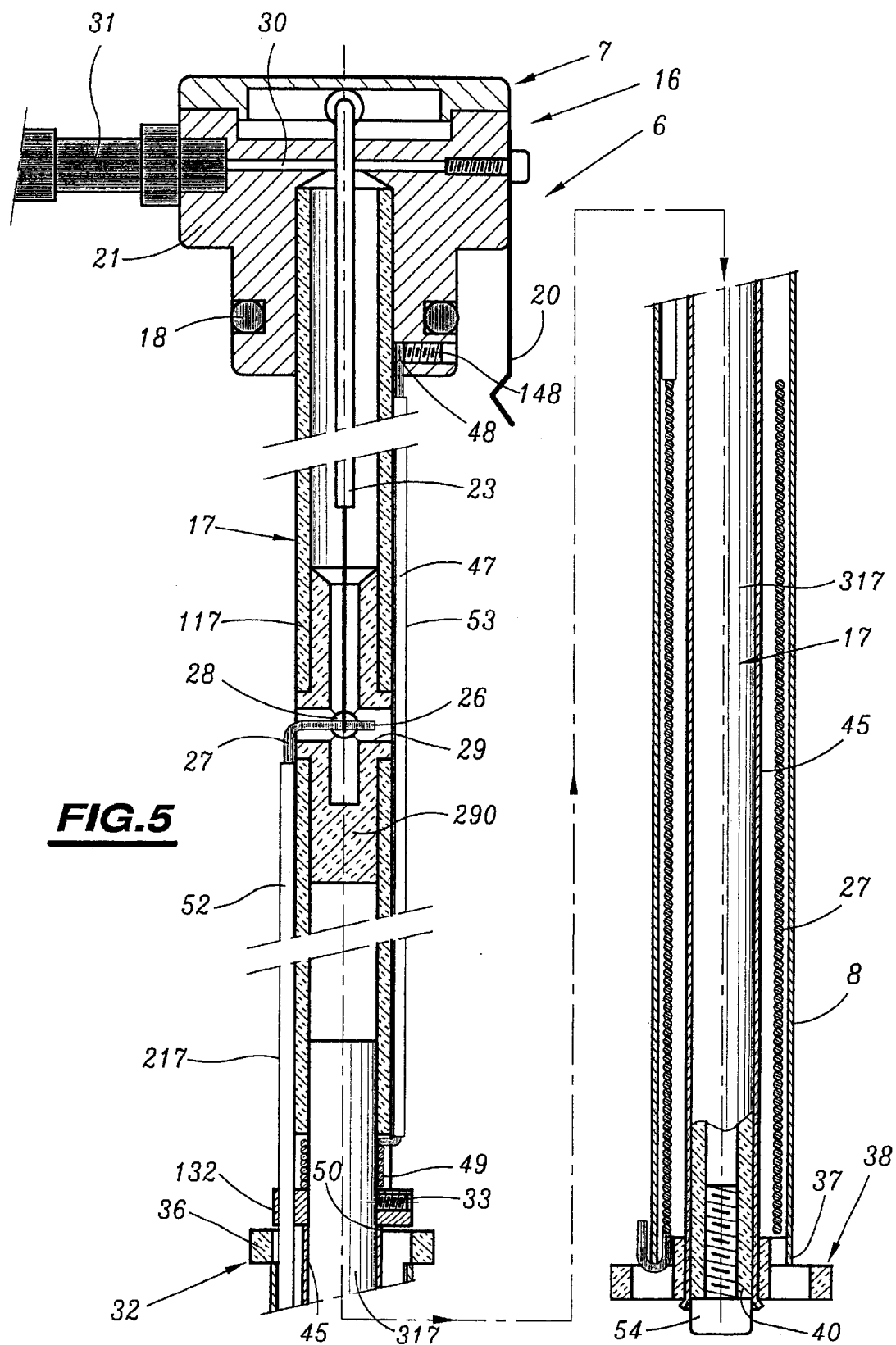
FIG. 5 is a longitudinal sectional diagrammatic view of a probe according to a second embodiment of the invention.

According to a second embodiment illustrated in FIG. 5, the probe 6 comprises another tubular plate 45 having a circular base, coaxial with the plate 8 and placed inside the latter. The section 217 of the rod 17 is short and is extended downwards by another section 317 fitted into its bottom end. The plate 45 of axis X—X is engaged on and slides telescopically along the section 317. The spring 27 passes between the plate 45 and the plate 8. The sleeve 32 and the end-piece 38 fasten the two plates 8 and 45 together and maintain a gap between them so that these plates between them define a space for receiving liquid.

The plate 45 is electrically connected to the metal body 21 of the head 16 by means of a conductor 47. The top end 48 of the conductor 47 is connected and fixed to the body 21 by means of a transverse screw 148 and the other end 49 is connected and fixed to a metal ring 132 brazed onto the top end 50 of the plate 45, through which ring the adjustment screw 33 passes.

This conductor 47, in the form of a long thin helical spring, is wound around the rod 17 between the bottom end of the section 217 and the ring 132, in order to allow the joint movement of the plates 8 and 45 with respect to the rod 17.

Insulating sheaths 52 and 53 respectively surround the springs 27 and 47 over the vertical straight part of their lengths in order to limit the risks of a short-circuit between the plates 8 and 45. The bottom part 317 of the rod 17, of smaller cross section, is closed off at its bottom end 40 by a screwed-in plug 54.

The plates 8 and 45 form another measurement capacitor, the second plate of which consists of the plate 45, this measurement capacitor being placed electrically parallel to the first measurement capacitor described with regard to FIGS. 1 to 4. The plate 8 is a first plate common to the two measurement capacitors.

This second embodiment makes it possible to improve the resolution of the probe 6 with respect to that in FIGS. 1 to 4 by virtue of the presence of an additional measurement capacitor.

The plates 8 and 45 are supported by the rod 17 so that they can be adjusted between a high measurement position, corresponding to a retracted position of the telescopic probe 6, and a low measurement position, corresponding to a deployed position of the probe 6. The springs 27 and 47 act as means for returning the plates 8 and 45 to their high position.

What is claimed is:

1. A capacitive measurement apparatus for measuring the level of a liquid in a tank comprising:
   a probe comprising a first plate and a second plate, the plates forming a measurement capacitor to be connected to an electrical voltage supply, the plates to be partially immersed in the liquid and to define, therebetween, a space for receiving the liquid; and
   a body supporting the first plate and electrically connecting with the second plate;
   wherein the first plate is adjustably mounted on the body between at least a high measurement position and a low measurement position.

2. The apparatus according to claim 1, wherein the first plate is slidable with respect to the body between the positions.

3. The apparatus according to claim 1, wherein the second plate is adjustably mounted on the body between at least a high measurement position and a low measurement position.

4. The apparatus according to claim 3, wherein the second plate is fastened to the first plate.

5. The apparatus according to claim 3, wherein the second plate is tubular and slides telescopically with respect to the body.

6. The apparatus according to claim 3, further comprising means for returning the second plate towards one of the positions.

7. The apparatus according to claim 6, wherein the return means comprises an electrical connection connecting the second plate to the voltage supply.

8. The apparatus according to claim 1, wherein the first plate is tubular and slides telescopically with respect to the body.

9. The apparatus according to claim 1, further comprising means for returning the first plate towards one of the positions.

10. The apparatus according to claim 9, wherein the return means comprises an electrical connection connecting the first plate to the voltage supply.

11. A storage system for a cryogenic fluid in liquid/vapour equilibrium comprising a storage tank equipped with a capacitive measurement apparatus for measuring the level of liquid in the tank, the apparatus placed in a cavity defined by walls of the tank, the apparatus comprising:
    a probe comprising a first plate and a second plate, the plates forming a measurement capacitor to be connected to an electrical voltage supply, the plates to be partially immersed in the liquid and to define, therebetween, a space for receiving the liquid; and
    a body supporting the first plate and electrically connecting with the second plate;
    wherein the first plate is adjustably mounted on the body between at least a high measurement position and a low measurement position.

12. The system according to claim 11, wherein one of the walls defining the cavity comprises the second plate.

13. The system according to claim 12, further comprising an electronic processing unit connected to the measurement capacitor, the unit determining the level of the liquid and controlling means for supplying the tank with cryogenic liquid or for actuating an alarm.

14. The system according to claim 11, further comprising an electronic processing unit connected to the measurement capacitor, the unit determining the level of the liquid and controlling means for supplying the tank with cryogenic liquid or for actuating an alarm.

* * * * *